United States Patent Office — 2,903,361 — Patented Sept. 8, 1959

2,903,361

PROCEDURES AND COMPOSITIONS FOR THE TREATMENT OF FLOUR

Henry C. Marks, Glen Ridge, Robert R. Joiner, Belleville, and Hugh K. Parker, Glen Ridge, N.J., assignors to Wallace & Tiernan Incorporated, Belleville, N.J., a corporation of Delaware No Drawing. Application January 12, 1956
Serial No. 558,622

35 Claims. (Cl. 99—93)

This invention relates to procedures and compositions for the treatment of cereal milling products, and specifically for treating flour to mature it for better use in the manufacture of bread and other baked goods.

It has long been recognized that as a general rule flour is improved for baking purposes by a so-called maturing action. Indeed much of the wheat flour produced is relatively unsuitable for baking immediately after milling. The primary effect of maturing the flour is manifested by improvement in the ultimate loaves of bread or the like, with respect to factors such as the following: the volume of the loaf (being larger for a given quantity of flour), its grain, texture, crust color and crumb color, and other crumb or body characteristics determinable on so-called break and shred tests. In general, the object is to achieve bread and similar baked products that are light, soft and suitably moist, yet sufficiently firm or resilient, and that have crust and internal properties of a pleasing and palatable nature.

A further important effect of the maturing of flour is an improvement in the viscosity characteristics or more generally the rheological properties of dough made from the flour, whereby the dough is smoother and less sticky, or otherwise in such physical condition that the baker can handle it with less difficulty, e.g. through successive stages of mixing, kneading, developing or the like, and through various manipulations such as are involved in dividing, rounding, molding and panning.

In earlier times flour was conventionally matured by storing it for rather long periods, as for several months or more, but in recent years, chemical agents have been used with the view of achieving maturing action without long storage. The most successful agents so employed have been certain reactive gases, of which chlorine dioxide is currently preferred.

The gas treatment of flour is somewhat cumbersome, requires rather complex apparatus and is apt to be difficult to control for optimum results. Chlorine dioxide in concentrated form would present a problem of explosion hazard, so that this gas must usually be generated at the locality of use and must be produced or delivered with the aid of special equipment that insures its dilution with a large proportion of air. While considerable success in bleaching flour, as distinguished from maturing it, has been achieved with dry, solid chemical compositions comprising benzoyl peroxide that are used in pulverulent form and very small amount and that are thus simply mixed with the dry flour, there has long been a need for a maturing agent which can be applied in an equally simple fashion, either to the flour (for example, at the mill) or to the dough mixture when it is made up at the bakery. Certain improving agents such as bromates and iodates, especially potassium bromate, have been employed in baking operations with certain desirable results in the ultimate loaf or other product, e.g. improved texture and loaf volume. These agents, however, in most cases do not fulfill all the requirements of maturing action in flour. They do not react in flour alone, either dry or wet, but act in the dough mix only as and after fermentation by yeast, with accompanying generation of acid, has occurred. They have at best only a limited effect on the rheological or handling properties of the dough. In practice, bromates and iodates represent a class of agents that are known as dough improvers and that are used in bakeries to make slight modifications in the baking properties of a flour which has already received the major part of its needed maturing treatment.

The present invention embraces the discovery of a new class of agents for maturing flour, and specifically the discovery that effective maturing action can be achieved by treating flour (either alone or in dough) with one or more agents of the group defined below, viz. certain chemical compounds which may be preliminarily described as derivatives of azodicarboxylic acid and which apparently have not heretofore been used for the treatment of flour or been known to have the capability of a maturing action.

These compounds are non-gaseous and non-explosive, and as used represent safe and harmless additions to flour and edible products made therefrom. As explained below, they have surprisingly effective maturing action in the flour, both as to the ultimate characteristics of the baked product and as to the rheological and other properties of the dough, while at the same time and especially in their preferred forms, they exhibit other advantages as will be explained. More particularly the invention embraces procedure for the treatment of flour to mature it, comprising admixture of such chemical compound with the flour (e.g. alone or in dough), preferably in relatively very small amount. Compositions of the invention comprise preparations containing chemical material of the described class uniformly mixed or dispersed with appropriate carrier material (preferably in dry pulverulent form), which may be entirely inert, or which may at least in part embrace salts or other substances having other utility in flour or dough.

The compounds employed in the invention may be more particularly defined as esters, amides, amidines, and mixed esters and amides, of azodicarbonic acid, alternatively known as azodiformic acid. The contemplated active ingredients or materials can thus be described as aliphatic azo compounds having the following structural formula:

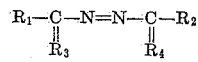

It will be understood that azodicarbonic acid, which is itself an unstable compound of no practical interest for present purposes but of which the described compounds may be defined as derivatives, has the above theoretical formula wherein $R_1$ and $R_2$ are OH groups and $R_3$ and $R_4$ are oxygen atoms.

In the compounds embraced by the invention, $R_3$ and $R_4$ are divalent radicals and $R_1$ and $R_2$ are monovalent radicals, all constituted so that in no instance is a carbon atom (if any) of such radical directly bonded to a carbon atom of the basic structure. In the esters and amides and mixed compounds of that category $R_3$ and $R_4$ are each oxygen atoms, whereas $R_1$ and $R_2$ are selected from a class consisting of alkoxy groups, and $NH_2$ groups, either substituted or unsubstituted. That is to say, in the amides or half-amides, the $NH_2$ group may appear as such, or as a radical wherein one or both of its hydrogen atoms is substituted by an appropriate group; these alternatives may be conveniently defined as the category of substituted or unsubstituted $NH_2$ groups. In the case of the amidines, $R_3$ and $R_4$ are each an NH radical, whereas $R_1$ and $R_2$ are substituted or unsubstituted $NH_2$ groups.

The amides (such term being used herein to include substituted amides, unless otherwise indicated) of azodicarbonic acid have been found to have certain special characteristics in the invention, affording particular advantages and being therefore presently preferred in many cases. The amides appear to be most active, to have the greatest freedom from any possible attributes of toxicity, and to afford special convenience in use. They are solid substances, available in dry powder form, and can be effective when mixed with flour or dough in relatively minute proportions. They have the highly desirable property that their maturing action only takes place when the flour is mixed with water; when such mixture is made, their action is extremely rapid, being essentially instantaneous for practical purposes in dough making. Thus the amides can be mixed with flour as or when it is completed in the flour mill, and then when the ultimate dough is made up, they have a prompt maturing action; alternatively they can be employed at the bakery, in setting up the dough or sponge mix.

Of the amides, the most active appears to be the simplest, namely azodicarbonamide, which is the compound of the above formula wherein $R_1$ and $R_2$ are each an $NH_2$ group (unsubstituted) and $R_3$ and $R_4$ each an oxygen atom. Other but nevertheless highly useful amides are of substituted character, i.e. wherein the hydrogen atoms of the $NH_2$ groups are replaced with organic radicals, preferably alkyl radicals, such as methyl, ethyl, butyl, hexyl, heptyl, octyl and the like. While any number of the four replaceable hydrogen atoms (in the two $NH_2$ groups) can be replaced, practical convenience is served in making compounds of symmetrical character, i.e. where one hydrogen of each group is replaced or where both hydrogens of the two groups are replaced. Specific examples of substituted amides are also identified below.

The utility of the amidines of azodicarbonic acid in the present invention is similar to the amides, in that the amidines are generally solid substances and do not exert maturing action in the flour while in the dry state. The reaction progresses rapidly when water is added or present, as in dough mixtures, but this type of compound is not as active as the amides. The simplest of the amidines, viz. azodicarbonamidine (sometimes called azodicarbondiamidine) appears preferable to the others from the standpoint of activity, but it will be understood that amidines in which there are one or more substitutions for hydrogen atoms in the $NH_2$ groups are usefully characterized by flour-maturing ability. As in the case of the amides, the term amidine is herein generally employed to include the substituted compounds, it being understood that substitutions in the $NH_2$ groups can be effected in the same manner as for the amides, most conveniently in symmetrical fashion and preferably with alkyl radicals such as those stated above or elsewhere herein relative to the amides. It will also be appreciated that the amidines may be prepared, and used for purposes of the present invention, either in the free base form or in the form of salts, e.g. of conventional mineral acids, examples of such salts being the sulfates and hydrochlorides.

The esters of azodicarbonic acid are likewise effective as maturing agents in flour, but have some significant differences from the amides and amidines. The esters are generally liquids, so that application to dry flour requires them to be sprayed on or into the flour, or to be pre-applied (as by spraying or evaporation from a solvent), upon particles of a suitable solid carrier such as sodium chloride or other inorganic salt. Indeed, although the esters, in liquid form, can be directly incorporated in dough mixtures in their liquid state in any appropriate solution or emulsion, dispersal on a dry carrier is an effective mode of introduction. Suitable carriers comprise alkali metal (including ammonium) and alkaline earth, chlorides, sulfates and phosphates. As will be understood, the esters are compounds of the type set forth in the structural formula above, wherein $R_3$ and $R_4$ are each an oxygen atom and wherein $R_1$ and $R_2$ are organic groups including an oxygen atom for linkage to the carbon atoms of the azodicarbonic residue, these being preferably aliphatic oxy groups. That is to say, each of $R_1$ and $R_2$ may be an alkoxy group, each most usually the same as the other. Again, as in the case of the substituted amides and amidines, the alkyl portions of the alkoxy groups may be one of the type exemplified by methyl, ethyl, butyl, hexyl, heptyl, octyl and similar radicals.

A further, special characteristic of the esters is that they react essentially immediately on admixture with flour, even though no water may be present. Thus, the maturing action occurs promptly upon treating the dry flour. For some purposes this may represent an advantage, but it has generally been found that flour which has not been affected by a chemical maturing agent has somewhat better keeping properties, especially in warm climates or seasons. The esters are somewhat less active than the amides and amidines, for example in that several times as much diethyl azodicarboxylate is required to produce a given maturing effect, as in the case of azodicarbonamide.

Other compounds useful in the invention, wherein the general class defined above, consist of so-called mixed esters and amides of azodicarbonic acid. In such compounds, which have the same basic formula set forth above, $R_3$ and $R_4$ are each an oxygen atom, but of the radicals $R_1$ and $R_2$, one is an esterifying group and the other is an $NH_2$ group or such group in substituted form, exactly as explained above in connection with the amides. For convenience in definition, the compound can be considered as having at $R_1$ an alkoxy group and at $R_2$ the $NH_2$ group or such amide-forming group in substituted form; since the basic formula is symmetrical, it makes no difference for purposes of description, which of the two groups is defined as being at one or the other end of the formula. It will be understood that the alkoxy and amide-forming groups can respectively be exactly as described hereinabove relative to the esters and amides, the same examples being applicable. Thus the simplest type consists of the unsubstituted amide (where $R_2$ is $NH_2$) and a correspondingly simple ester group, such as the methoxy or ethoxy radical. For brevity, a mixed ester and amide of the sort here contemplated can be styled a mixed ester-amide.

These mixed ester-amides of azodicarbonic acid are useful maturing agents for flour, and unlike the straight esters, are in general solid products which can be prepared in pulverulent form for ready mixing with flour. Like the amides and amidines, they do not react, to exert their maturing function, immediately upon admixture with the flour; their effectiveness is only exhibited when moisture is present, as in making dough. Over considerable periods of time, however, the mixed ester-amides of azodicarbonic acid have some tendency, after mixture with the flour, to decompose or in effect disappear. If used at the time of making a dough mixture, or if applied to the flour not more than a few weeks, say, before it is employed in making dough, these substances are useful as maturing agents, with results generally similar to those achieved with the amides and esters. Their activity appears to be somewhat less than that of the amides, in that larger quantities are required for optimum results.

In performing the process of flour treatment with one or another of the agents described above, it is usually important or at least preferable to provide a mixture of the compound (or compounds) with a suitable carrier, the resulting composition being then applied to flour by thorough admixture. The carrier is preferably a very finely pulverulent material, suitable for effective mixing with flour, examples of appropriate carriers being starch, i.e. in the form of corn starch, flour and common salt (sodium chloride), all of these being essentially inert materials so far as treatment of the flour is concerned. Other inorganic salts can be employed, such as other mineral acid salts (particularly chloride, sulfates and phosphates) of alkali metals and alkaline earth metals, ammonium being considered in the class of alkali metals. The selected carrier should be a stable, non-toxic and harmless material and such as to introduce no undesirable taste in the flour. Where the addition of the maturing agent is made to the flour, an ash-free material such as starch or flour itself is preferred. Similar compositions can be used for incorporation in dough or in a dry mix to be made just before dough preparation, but a carrier such as salt (sodium chloride) is very satisfactory at this stage. It will be appreciated that the carrier effectively facilitates incorporation and dispersal or distribution of the active agent within the flour or dough mixture, i.e. so that the agent more or less uniformly reaches all portions of the body or stream of flour under treatment.

As explained above, the unsubstituted amide, specifically azodicarbonamide (which is also called azodiformamide) is at present preferred as the active agent, because it appears to be the most active of all, is easiest to manufacture and is convenient to use. It is a stable, yellow powder, which can be made up readily into intimate, uniform mixtures with a wide variety of powdered carrier materials (or even finely granular or crystalline carriers), for ready application to flour, dry dough mix, or dough.

A further feature of the invention is that the improved composition may include other ingredients useful for making bread, either as part or all of the carrier. For example, preparations to be employed for treating the flour or dough at the bakery, may include not only salt but additionally or alternatively, such materials as yeast food salts which are commonly employed. These latter substances include one or more of compounds such as calcium sulfate, sodium chloride and ammonium chloride. It is also possible to combine the treating agent (particularly where the treatment is to be effected at the flour mill or otherwise, in the flour some time prior to use in making dough) with other active agents such as organic peroxides that are used in the bleaching of flour, for example benzoyl peroxide as in its preferred form, dibenzoyl peroxide. Thus combinations of azodicarbonamide and dibenzoyl peroxide, preferably with additional carrier material such as potassium alum, calcium carbonate and calcium phosphates, have been found to constitute effective agents for maturing and bleaching flour. These active ingredients appear to be entirely compatible, with no deteriorating or other objectionable effect on either by reason of the presence of the other. It will be understood that when such a preparation is mixed with flour, the bleaching operation commences promptly and continues over a period of time, while the maturing action by the azodicarbonamide is delayed until the treated flour is ultimately made up with water in the course of preparing dough.

The amount of maturing agent to be employed for optimum results varies with the specific type and composition of such agent, as indicated above, and also with the kind of flour. Optimum results are defined as optimum maturing action; such action will be incomplete if there is insufficient chemical employed. An excess of the agent may also result in a condition of the flour, which is somewhat less desirable than the effect of best maturing, such over-treated condition being observable, for example in the ultimate bread, as a somewhat smaller volume of loaf (with a given weight of flour) and a somewhat coarser texture, than the optimum. As will be appreciated, optimum amounts for a given agent and a given flour are readily determinable by simple test, e.g. baking tests such as are conventional in both the milling and baking industries for control of flour treatment operations or of dough making.

By way of example of various specific agents that can be used, and particularly by way of example of amounts required in most of the cases (with the given flour) to obtain substantially optimum results, Table 1 (below) provides illustrative data. In each line of this table, the volume and texture characteristics of bread made with the treated flour represent results which can be characterized as relatively good, indeed in the neighborhood of optimum, for the particular treating agent used and the particular flour employed. As explained above, the amounts of agent for optimum effect will vary with different flours, and may also be changed where requirements of result may differ; for example if in a given instance less than a complete maturing is desired.

In the table, the compound used in each case is identified by the several constituents constiting $R_1$, $R_2$, $R_3$ and $R_4$ of the above formula for derivatives of azodicarbonic acid. The concentration expresses the amount used to treat the flour, in parts per million by weight. In every case bread dough was made from the flour, i.e. soon after treatment, and the volume of the resulting loaves of bread was measured, in comparison with loaves of bread produced from the same kind of flour without treatment. The table thus shows, in each instance, the percent of increase in loaf volume achieved by the use of the defined treating agent. All dough formulas and mixing and baking practice were of a standard character, equivalent to the conventional usage (in commercial bakeries) for making white bread of good quality. The flour employed was the same in all cases; viz. a wheat (i.e. white) flour, and more specifically, a West Coast patent flour, selected for its pronounced oxidation response.

The so-called texture score given in the last two col-

TABLE 1

| No. | Composition | | | | Concentration | Percent Increase in Volume | Texture Score | |
|---|---|---|---|---|---|---|---|---|
| | $R_1$ | $R_2$ | $R_3$ | $R_4$ | | | Untreated | Treated |
| 1 | $-OC_2H_5$ | $-OC_2H_5$ | $=0$ | $=0$ | 300 | 34 | 78 | 98 |
| 2 | $-OC_2H_5$ | $-NH_2$ | $=0$ | $=0$ | 50 | 39 | 83 | 93 |
| 3 | $-NH_2$ | $-NH_2$ | $=0$ | $=0$ | 20 | 23 | 86 | 94 |
| 4 | $-NHCH_3$ | $-NHCH_3$ | $=0$ | $=0$ | 30 | 22 | 90 | 93 |
| 5 | $-NHC_4H_9$ | $-NHC_4H_9$ | $=0$ | $=0$ | 50 | 11 | 88 | 92 |
| 6 | $-NHC_7H_{15}$ | $-NHC_7H_{15}$ | $=0$ | $=0$ | 200 | 18 | 87 | 90 |
| 7 | $-N(CH_3)_2$ | $-N(CH_3)_2$ | $=0$ | $=0$ | 200 | 18 | 87 | 90 |
| 8 | $-NH_2$ | $-NH_2$ | $=NH$ | $=NH$ | 200 | 14 | 79 | 95 |
| 9 | $-OCH_3$ | $-OCH_3$ | $=0$ | $=0$ | 200 | 14 | 83 | 87 | umns of the table represents a scoring system for evaluating preferred properties of the finished bread. In making such evaluation, the scale used by the observer or observers ranges from 70 to 100. The observations are all in effect judgments of appearance, feel and the like; the numerical values are assigned by the judgment of the observer or observers, in accordance with the stated scale wherein for each given property 100 represents that property as it should exist for the best all-around bread (by conventional standards of demand), the range 90–100 is satisfactory, 80–90 is fair, and 70–80 is poor. Independent judgment of the loaves or their interior structures are reached separately for grain, texture, crumb color, crust color, break, shred and symmetry of form. Grain is scored by comparison with photographs of specimens used as standards, while texture is determined by the sense of touch, and all other properties by visual inspection. The final "texture score," e.g. as set forth in the above table, is an average of all these properties. It will be noted that a score of these characteristics was reached for both the untreated bread and the bread made with treated flour in each case, i.e. for direct comparison.

It will be seen that compound No. 1 in the table, viz. the diethyl ester, afforded good results when used in a relatively large amount. The mixed ester and amide (No. 2) also gave very good results, at considerably less concentration of the agent. Substance No. 3, azodicarbonamide, was highly effective; only a relatively small amount of it was needed, i.e. 20 parts per million, based on the weight of the flour. Various substituted amides listed as Nos. 4 to 7 gave good results in varying degree, as indicated. Substance No. 8 in the table is the simplest amidine (azodicarbonamidine), which was quite effective when employed at a rather high concentration, as was likewise the di-methyl ester, substance No. 9.

It has been explained above that the quantity of treating agent to be employed will depend on the characteristics of the individual flour, as can be determined by conventional baking tests. By way of example, it appears that for the various types and grades of wheat flour commonly sold, the amount of azodicarbonamide to give optimum maturing effect will range from 5 p.p.m. to 25 p.p.m., by weight. In Table 2, baking tests with two different kinds of flour are set forth, in each case representing optimum results with the azodicarbonamide (abbreviated ADA). For comparison, tests were included not only on the untreated flour, as control, but also with treatment by the addition of potassium bromate (and no other improving or maturing agent). As is conventional, the bromate was added in aqueous solution thereof. Although not shown by the table, it will be understood that potassium bromate has no more than a limited effect in improving the viscosity or rheological properties of the dough, in contrast to ADA as indicated above. In these operations, as in those for Table 1, the flour was made up into dough (with addition of the treating agent, where indicated) which was mixed and developed, divided, proofed and baked into bread for examination of loaf characteristics. The volume in each instance represents the volume in milliliters of a loaf prepared from 100 grams of flour with conventional dough ingredients and dough making operations; such dough ingredients include salt, water and yeast, with fermentation afforded either by time of standing of the dough, or as in these tests, by adding the yeast in the form of a fermented broth. This table shows the difference in amount of treating agent (ADA) required for comparable results with the two different flours, which are identified by designations as recognized in the art.

TABLE 2

| Flour | Treatment | Loaf Volume (ml.) | Texture Score |
|---|---|---|---|
| #4393 Bluestem (Patent) | Untreated Control | 700 | 88 |
| | 10 p.p.m. ADA | 810 | 95 |
| | 10 p.p.m. KBrO₃ | 820 | 93 |
| #4383 (1st Clear) | Untreated Control | 640 | 88 |
| | 20 p.p.m. ADA | 840 | 94 |
| | 20 p.p.m. KBrO₃ | 850 | 94 |

A further, specific advantage of the present treating agents is that they have very little tendency to produce rancidity in the treated flour under conditions where such deterioration may occur or may indeed tend to be promoted by other chemicals. For example, the particular type of flour identified as #4383 above, when stored for 23 weeks in a warm air cabinet to accelerate onset of rancidity, showed signs of this type of deterioration at the end of that time even though no treatment had been applied. When this same flour was treated with 1.25 grams of chlorine dioxide per 100 pounds of flour (such being optimum treatment for maturing action) rancidity of the flour became evident after only seven weeks under the described conditions of storage. When the same flour, however, was treated with 20 p.p.m. of azodicarbonamide (again optimum treatment for maturing) no rancidity could be detected until 21 weeks had passed.

The process of the invention, for maturing flour, may be carried out in various ways as by mixing the active agent (preferably in a composition embodying carrier material) with dry flour in appropriate amounts (such as from 5 to 500 p.p.m. by weight, depending on the flour, the agent used and the results desired) or by admixture of the agent or compositions containing it with dough or partly prepared dough or with various mixes that include flour and that are to be used in making baked products. The treatment is particularly important for wheat flour of various classes and types, ordinarily known as white flour, but may also be used with other cereal milling products, such as whole wheat flour and mixtures of ordinary wheat flour with whole wheat or rye flours.

Where the treatment with the present agents is to be employed at the bakery, for example in connection with the making of bread dough or other yeast-leavening dough, the agents or compositions of the invention can be incorporated at any suitable time, preferably at an early stage in the dough making process. For example, if the straight dough process is used, the active agent is conveniently incorporated with the flour or with the entirety of the ingredients as the mix is made up at the very outset of the procedure.

In the case of the sponge dough process, the agent can be incorporated at the time the ingredients are mixed for the sponge and then if more complete advantages of matured flour are desired, further quantities of the active agent can be incorporated at the time of final dough-up, when additional flour and water are added. In some such cases it may not be necessary to add further maturing agent; alternatively, if a matured condition is not required during sponge preparation and fermentation, the inclusion of the active agent can be postponed until final dough-up. If dough is made by the broth process, utilizing a fermented, yeast-containing broth and omitting long fermentation of the dough, the maturing agent can be included with the flour at the time of mixing or added directly to the dough at the outset of the mixing operation. The maturing action, as explained, is promptly accomplished in all dough mixtures, so that full advantages of matured flour are readily obtained, in the mixing operation itself and especially in the handling of the dough after mixing, and most significantly, in the properties of the ultimate bread or other product. Of course, the maturing agent can be added to the flour in advance of any dough mixing step, or even long before, if such practice is more convenient. It will be understood that generically herein (unless otherwise indicated) the term "dough" is used to include sponge as prepared for making bakery products by the sponge process.

The flour treating compositions of the invention, to be used in such treatment by application to flour itself (as at the flour mill or later), or to various doughs (including sponges and batters) or other mixes, can be embodied in various forms, including suitable carrier and other ingredients, all very preferably in a finely divided state so as to facilitate mixing. Purely by way of illustration, the following are specific examples of some useful compositions. In each case the amounts of ingredients are set forth in percentage by weight of the complete composition, and unless otherwise stated all ingredients are incorporated as fine powders.

Example I

An effective composition, especially for treating dry flour at the mill, consists of the following:

| | Percent |
|---|---|
| Azodicarbonamide | 8.5 |
| Corn starch | 91.5 |

Example II

The following composition, particularly designed to be employed at flour mills or in like treatment of dry flour, provides both a maturing and a bleaching action, the several inorganic compounds serving collectively as a carrier and being cooperatively suited for such purpose with respect to both the azo compound and the organic peroxide. Indeed it is customarily deemed important that benzoyl peroxide, when prepared for flour bleaching, be diluted with one or more inert ingredients. This composition, like that of Example I, is prepared in a very finely pulverulent form:

| | Percent |
|---|---|
| Azodicarbonamide | 20.0 |
| Dibenzoyl peroxide | 26.2 |
| Potassium alum | 34.6 |
| Calcium carbonate | 8.0 |
| Dicalcium phosphate | 7.2 |
| Tricalcium phosphate | 4.0 |

Example III

This composition is especially useful for incorporation with dry flour or with dough mixes or directly in dough at bakeries, e.g. where dough is made by the straight dough process or where the dough is partially prepared in the form of sponge, the additive being incorporated in the sponge mixture as it is made up. In particular, the composition contains not only the maturing agent but also yeast food salts, of conventional utility in dough making operations wherein the bread or equivalent dough is subjected to a long fermentation period. The flour in the composition serves as carrier for all ingredients, the yeast food salts themselves cooperating as carrier for the aliphatic azo compound. The following is a suitable formula for the composition:

| | Percent |
|---|---|
| Azodicarbonamide | 0.3 |
| Calcium sulfate | 24.9 |
| Sodium chloride | 24.9 |
| Ammonium chloride | 10.0 |
| Flour | 39.9 |

Example IV

In this preparation, an ester of azodicarbonic acid is employed, in combination with sodium chloride as a carrier. The ester, being a liquid, is conveniently dissolved in ether and the ether solution then applied to the pulverulent or otherwise very finely divided sodium chloride, being allowed to dry on the latter. As a result the active agent is deposited, essentially as a coating, on the sodium chloride particles, thereby providing an essentially uniform mixture of the active agent and carrier, in the equivalent of a dry condition, suitable for admixture with flour in the same fashion as the powder compositions of Examples I and II. The following proportions may be employed:

| | Percent |
|---|---|
| Diethyl azodicarboxylate | 1.0 |
| Sodium chloride | 99.0 |

Example V

In this composition, the active agent is an amidine of azodicarbonic acid, conveniently employed in a mineral salt form, viz. as the sulfate:

| | Percent |
|---|---|
| Azodicarbonamidine sulfate | 25.0 |
| Corn starch | 75.0 |

Example VI

In this case, the amidine is mixed with another type of carrier, also appropriate for use in flour and baked products:

| | Percent |
|---|---|
| Azodicarbonamidine sulfate | 25.0 |
| Dicalcium phosphate | 75.0 |

As explained, all of the examples are very preferably prepared in powder or equivalent form, with the ingredients uniformly mixed or dispersed. When the composition is applied, the amount used will be such as to provide the desired amount of active azo compound relative to the flour, for the desired maturing action. In mixing compositions of this type with dry flour, it will be understood that known feeding and mixing devices may be employed, for instance as conventionally used for incorporating bleaching agents of the organic peroxide type.

It will be understood that invention is not claimed herein for the chemical compounds per se, apart from the compositions and procedures defined. Indeed compounds of this class, such as azodicarbonamide, azodicarbonamidine and numerous others have been well known as chemical substances for a long time, and suitable methods for making all the various compounds of the described group are likewise well known. It is believed, however, that there has been no previous recognition of any utility of these compounds for the treatment of flour. The maturing function achieved by the present invention has been abundantly demonstrated in many tests, such as exemplified above. Inasmuch as the exact chemical or other action accomplished by the aliphatic azo compound is difficult to ascertain (as is also the case with a number of maturing agents heretofore used), the present discovery is predicated upon actual practical effect of the process and composition rather than upon any chemical or other theory of action in the flour particles.

Some additional features or aspects of the invention should be mentioned. It has been found, for example, that where the present maturing agent, such as azodicarbonamide, is mixed with the flour, and bromate (e.g. potassium bromate) is employed in the dough in the usual way, the results in the ultimate bread, as to texture and appearance, are significantly better in many cases than where the same flour has been treated with chlorine dioxide for maturing and is later made into dough with bromate in conventional fashion. This special advantage of the combined use of these materials, e.g. azodicarbonamide and bromate, is realized whether the compounds are both applied to the dough, or the ADA is applied to the flour first (or long before) and the bromate is added when the dough is made. In each case the ADA is used in optimum amount for its own maturing action, and the bromate is employed in an amount normally deemed optimum for its customary effect. The bromate is preferably that of potassium and is conveniently added in aqueous solution; alternatively, other soluble bromates (e.g. sodium, ammonium, calcium and magnesium) may be used.

Where azodicarbonamide and benzoyl peroxide are used together for the maturing and bleaching of flour, some advantage is obtained by making the proportions in the mixed composition such that optimum maturing will usually be accompanied by less than optimum bleaching. In such cases, the benzoyl peroxide would serve as an indication of treatment; the production of some bleaching action will mark the flour as having been treated by the composite preparation, while the incompleteness of bleach may even be taken to show, in suitable cases, that there has been no serious over-treatment with the maturing agent. Furthermore, the optimum quantity of the bleaching agent (for various flours) varies independently of the optimum amount of maturing agent. Hence it is better to have less than enough benzoyl peroxide and to be sure that the azodicarbonamide is used in just the right amount, than to risk over-maturing in perhaps many cases. Example II above is in fact an instance of such composition, in that the amount of benzoyl peroxide, relative to the ADA, provides considerable or at least detectable bleaching but is insufficient to achieve complete bleaching action in at least many flours when the preparation is used in amount to provide substantially optimum maturing by the ADA. With compositions of this type, the complete treating process will therefore frequently involve the application of additional benzoyl peroxide as a separate step.

It is to be understood that the invention is not limited to the operations and formulations hereinabove set forth, but may be carried out in other ways without departure from its spirit.

We claim:

1. A process of treating flour to mature it, comprising admixing with the flour, material selected from the group consisting of esters, amides, mixed ester-amides, and amidines of azodicarbonic acid, the compounds of said group having the formula

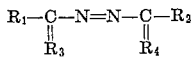

said esters, amides and mixed ester-amides being compounds of said formula wherein each of $R_3$ and $R_4$ is oxygen and each of $R_1$ and $R_2$ is selected from the class consisting of alkoxy groups, $NH_2$ is selected from the class consisting of alkoxy groups, $NH_2$ and alkyl-substituted $NH_2$ groups, and said amidines being compounds of said formula wherein each of $R_3$ and $R_4$ is NH and each of $R_1$ and $R_2$ is selected from the class consisting of $NH_2$ and alkyl-substituted $NH_2$ groups, and the amount of said selected material relative to the flour being a quantity, in the range extending upward from a few parts per million, which is suitable for maturing action in the flour.

2. A process as defined in claim 1, wherein the material is admixed with the flour by mixing the material into a water-containing dough mixture that contains the flour.

3. A process of treating flour to mature it, comprising admixture with the flour an alkyl ester of azodicarbonic acid, in amount suitable for maturing action in the flour.

4. A process as defined in claim 3, wherein the ester, before admixture with the flour, is first dispersed in a solid, finely divided carrier, and is applied to the flour in association with said carrier.

5. A process of treating flour to mature it, comprising admixing with the flour an amide of azodicarbonic acid, in an amount relative to the flour, in the range extending upward from a few parts per million, which is suitable for maturing action in the flour.

6. A process as defined in claim 5, wherein the amide is azodicarbonamide.

7. A process as defined in claim 5, in which the amide is an alkyl-substituted amide.

8. A process of treating flour to mature it, comprising admixing with the flour an amidine of azodicarbonic acid, in amount suitable for maturing action in the flour.

9. A process of treating flour to mature it, which comprises admixing with the flour a mixed ester and amide of azodicarbonic acid, in amount suitable for maturing action in the flour.

10. A process as defined in claim 1, which includes the procedure of making dough by mixing together dough ingredients including said flour and water, and wherein the dough-mixing step includes incorporating bromate in the dough mixture for improving action therein.

11. A process as defined in claim 1, which includes the procedure of making dough by mixing together dough ingredients including said flour and water, and wherein the dough-mixing step includes incorporating bromate in the dough mixture for improving action therein, the aforesaid step of admixing the selected material with the flour being effected by adding said selected material to the dough mixture as it is made up.

12. A process of making dough for baked products wherein dough ingredients including flour and water are mixed together, the step of treating the flour in said dough to mature it, which comprises adding to and admixing with the dough ingredients, material selected from the group consisting of esters, amides, mixed ester-amides and amidines of azodicarbonic acid, the compounds of said group having the formula

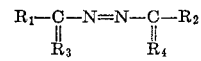

said esters, amides and mixed ester-amides being compounds of said formula wherein each of $R_3$ and $R_4$ is oxygen and each of $R_1$ and $R_2$ is selected from the class consisting of alkoxy groups, $NH_2$ and alkyl-substituted $NH_2$ groups, and said amidines being compounds of said formula wherein each of $R_3$ and $R_4$ is NH and each of $R_1$ and $R_2$ is selected from the class consisting of $NH_2$ and alkyl-substituted $NH_2$ groups, and the amount of said selected material relative to the flour being a quantity, in the range extending upward from a few parts per million, which is suitable for maturing action in the flour.

13. A process as defined in claim 12, in which the selected material is an amide of azodicarbonic acid.

14. A process as defined in claim 12, in which the selected material is azodicarbonamide.

15. A process as defined in claim 12, in which the selected material is azodicarbonamidine.

16. In a process of preparing dough, the procedure of treating flour with azodicarbonamide and bromate by admixture of said materials with the flour, to afford maturing and improving action in the dough, said process comprising making dough by mixing together dough ingredients including the flour and water, the amount of said azodicarbonamide relative to the flour being a quantity, in the range extending upward from a few parts per million, which is suitable for maturing action in the flour.

17. A process as defined in claim 16, wherein the admixture of the bromate with the flour is effected by adding the bromate to the dough mixture as it is made up.

18. A composition for treatment of flour to mature it, comprising a mixture of material selected from the group consisting of esters, amides, mixed ester-amides and amidines of azodicarbonic acid, and carrier material which is dry and finely pulverulent, and is harmless and free of undesirable taste effect in the production of baked products from flour treated with the composition for maturing such flour, the compounds of said group having the formula

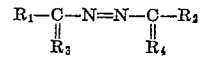

said esters, amides and mixed ester-amides being compounds of said formula wherein each of $R_3$ and $R_4$ is oxygen and each of $R_1$ and $R_2$ is selected from the class consisting of alkoxy groups, $NH_2$ and alkyl-substituted $NH_2$ groups, and said amidines being compounds of said formula wherein each of $R_3$ and $R_4$ is NH and each of $R_1$ and $R_2$ is selected from the class consisting of $NH_2$ and alkyl-substituted $NH_2$ groups, said selected material being present in said composition in a quantity which is sufficient, on admixture of the composition with flour, to provide effective maturing action in the flour, and said carrier material being present in an amount to facilitate dispersal of said selected material in the flour.

19. A composition as defined in claim 18, in which the carrier material comprises inorganic salt material.

20. A composition as defined in claim 19, in which the selected material is an ester of azodicarbonic acid, in liquid form, and is dispersed on the particles of the inorganic salt material.

21. A composition as defined in claim 18, in which the selected material is in pulverulent solid form and the carrier material comprises flour.

22. A composition as defined in claim 18 in which the carrier material comprises corn starch.

23. A composition as defined in claim 18, in which the carrier material comprises yeast food salts which comprise calcium sulfate, sodium chloride and ammonium chloride.

24. A composition for treatment of flour to mature it, comprising a mixture of an alkyl ester of azodicarbonic acid, and carrier material which is dry and finely pulverulent, and is harmless and free of undesirable taste effect in the production of baked products from flour treated with the composition for maturing such flour, said alkyl ester being present in said composition in a quantity which is sufficient, on admixture of the composition with flour, to provide effective maturing action in the flour, and said carrier material being present in an amount to facilitate dispersal of said alkyl ester in the flour.

25. A composition for treatment of flour to mature it, comprising a mixture of an amide of azodicarbonic acid, and carrier material which is dry and finely pulverulent, and is harmless and free of undesirable taste effect in the production of baked products from flour treated with the composition for maturing such flour, said amide being present in said composition in a quantity which is sufficient, on admixture of the composition with flour, to provide effective maturing action in the flour, and said carrier material being present in an amount to facilitate dispersal of said amide in the flour.

26. A composition as defined in claim 25, wherein the amide is azodicarbonamide.

27. A composition as defined in claim 25, in which the amide is an alkyl-substituted amide.

28. A composition as defined in claim 18, in which the selected material is azodicarbonamidine.

29. A composition as defined in claim 18, in which the selected material is the mixed ethyl ester and unsubstituted amide of azodicarbonic acid.

30. A composition for treatment of flour to mature and bleach it, comprising a pulverulent mixture containing azodicarbonamide and benzoyl peroxide material, said azodicarbonamide being present in said composition in a quantity which is sufficient to provide maturing action in the flour, and said benzoyl peroxide material being present in said composition in a quantity which is sufficient to provide bleaching action in the flour.

31. A composition as defined in claim 30, which includes inert carrier material uniformly admixed in the aforesaid mixture, said carrier material being dry and finely pulverulent, and being harmless and free of undesirable taste effect in the production of baked products from flour treated with the composition for maturing such flour.

32. A composition as defined in claim 30, in which the amount of benzoyl peroxide material relative to the amount of azodicarbonamide is sufficient to provide detectable bleaching action in flour but insufficient to provide complete bleaching action when the composition is added to flour in a quantity for providing substantially optimum maturing effect by the azodicarbonamide.

33. A dry pulverulent cereal product comprising flour having admixed therewith, for maturing the flour, solid material selected from the group defined in claim 1, and in the amount defined in claim 1.

34. A dry pulverulent cereal product comprising flour having admixed therewith an amide of azodicarbonic acid for maturing the flour, the amount of said amide relative to the flour being a quantity, in the range extending upward from a few parts per million, which is suitable for maturing action in the flour.

35. A dry pulverulent cereal product comprising flour having admixed therewith azodicarbonamide for maturing the flour, the amount of said azodicarbonamide relative to the flour being a quantity, in the range extending upward from a few parts per million, which is suitable for maturing action in the flour.

References Cited in the file of this patent

FOREIGN PATENTS 421,006     Great Britain _____ Dec. 12, 1934

UNITED STATES PATENT OFFICE
CERTIFICATE OF CORRECTION

Patent No. 2,903,361                                                   September 8, 1959

Henry C. Marks et al.

It is hereby certified that error appears in the printed specification of the above numbered patent requiring correction and that the said Letters Patent should read as corrected below.

Column 4, line 25, for "wherein" read — within —; column 6, line 31, for "constiting" read — constituting —; column 11, lines 27 and 28, strike out $NH_2$ is selected from the class consisting of alkoxy groups,"; line 41, for "admixture" read — admixing —; column 12, line 1, for "A process" read — In a process —.

Signed and sealed this 3rd day of May 1960.

(SEAL)
Attest:

KARL H. AXLINE                                              ROBERT C. WATSON
Attesting Officer                                         Commissioner of Patents